United States Patent [19]

Gardner et al.

[11] Patent Number: 5,255,210
[45] Date of Patent: Oct. 19, 1993

[54] SELF-COHERENCE RESTORING SIGNAL EXTRACTION APPARATUS AND METHOD

[75] Inventors: William A. Gardner, Yountville; Brian G. Agee, Davis, both of Calif.

[73] Assignee: The Regents of the University of California, Oakland, Calif.

[21] Appl. No.: 925,805

[22] Filed: Aug. 3, 1992

Related U.S. Application Data

[63] Continuation of Ser. No. 794,306, Nov. 14, 1991, abandoned, which is a continuation of Ser. No. 264,256, Oct. 28, 1988, abandoned.

[51] Int. Cl.⁵ ............................................. G06G 7/122
[52] U.S. Cl. .................... 364/574; 364/581; 364/572
[58] Field of Search ........... 364/574, 554, 715, 724.08, 364/724.09, 572, 581, 724.19; 455/307, 315, 303, 305, 306; 375/1, 99, 102, 103, 115

[56] References Cited

U.S. PATENT DOCUMENTS

| | | | |
|---|---|---|---|
| 3,626,168 | 12/1971 | Norsworthy | 364/554 |
| 3,947,634 | 3/1976 | Betts | 375/115 |
| 3,997,844 | 12/1976 | Jayant | 455/303 |
| 4,017,798 | 4/1977 | Gordy et al. | 375/1 |
| 4,039,749 | 8/1977 | Gordy et al. | 375/115 |
| 4,122,393 | 10/1978 | Gordy et al. | 375/1 |
| 4,198,634 | 4/1980 | Jernigan et al. | 364/559 |
| 4,222,051 | 9/1980 | Kretschmer, Jr. et al. | 455/303 |
| 4,255,574 | 3/1981 | Martin | 364/574 |
| 4,408,332 | 10/1983 | Sari | 375/99 |
| 4,641,259 | 2/1987 | Shan et al. | 364/724.16 |
| 4,931,977 | 6/1990 | Klemes | 364/581 |

FOREIGN PATENT DOCUMENTS

2166326 4/1986 United Kingdom ................ 455/305

OTHER PUBLICATIONS

I. Kidron; Enhancement of SNR of Turbulence IEEE, Jun. 67 Measurements by Cross Correlation.
Marvin Sambur; Adaptive Noise Cameling for IEEE, Oct. 1978 Speech Signals.
*Adaptive Arrays* (S. P. Applebaum, IEEE Trans. on Antennas and Propagation, vol. AP-24, No. 5, pp. 585-598, Sep. 1976).
*Adaptive Antenna Systems* (B. Widrow, P. E. Mantey, L. J. Griffiths, B. B. Goode, Proc. IEEE, vol. 55, No. 12, pp. 2143-2159, Dec. 1967).
*Introduction to Adaptive Arrays* (R. A. Monzingo, T. W. Miller, pp. 319-347, John Wiley & Sons, New York, 1980).
*Lattice Filters for Adaptive Processing* (B. Friedlander, Proc. IEEE, vol. 70, No. 8, pp. 829-867, Aug. 1982).
*Digital Communications* (J. G. Proakis, pp. 382-447, McGraw-Hill, 1983).
*An Adaptive Array in a Spread Spectrum Communication System* (R. T. Compton, Proc. IEEE, vol. 66, Mar. 1978).
A Simple Adaptive Algorithm for Real-Time Processing in Antenna Arrays (L. J. Griffiths, Proc. IEEE, vol. 57, pp. 1696-1704, Oct. 1969).
*An Algorithm for Linearly-Constrained Adaptive Array Processing* (O. L. Frost, Proc. IEEE, vol. 60, pp. 926-935, Aug. 1972).
The P-Vector Algorithm: A Linearly Constrained Point of View (L. J. Griffiths, M. J. Rude, Proc. Twentieth Asilomar Conf. on Signals, Systems and Computers, Pacific Grove, CA, Nov., 1986).

(List continued on next page.)

Primary Examiner—Thomas G. Black
Assistant Examiner—Michael Zanelli
Attorney, Agent, or Firm—John P. O'Banion

[57] ABSTRACT

A processor and method for extracting a signal s(t) from a signal input vector x(t) which has been corrupted by interfering signals and noise is described. The processor computes an output signal y(t) by forming the scalar product of x(t) and a vector w which is chosen such that the self-coherence or conjugate self-coherence of y(t) is maximized.

20 Claims, 6 Drawing Sheets

OTHER PUBLICATIONS

*Multiple Emitter Location and Signal Parameter Estimation* (R. O. Schmit, *Proc. RADC Spectrum Estimation Workshop*, Oct. 1979).

*Spatio-Temporal Spectral Analysis by Eigenstructure Methods* (M. Wax, T. Shan, T. Kailath, *IEEE Trans. ASSP.*, vol. ASSP-32, No. 4, pp. 817-827, (Aug. 1984).

Estimation of Signal Parameters via Rotational Invariance Techniques-ESPRIT (A. Paulraj, R. Roy, T. Kailath, *Proc. Nineteenth Asilomar Conf. on Signals, Systems and Computers*, Pacific Grove, CA, Nov. 1985).

A Method of Self-Recovering Equalization for Multi-level Amplitude Modulation Systems (Y. Sato, *IEEE Trans. Comm.*, vol. Com 23, pp. 679-682, Jun. 1975).

A New Approach to Multipath Correction of Constant Modulus Signals (J. R. Treicher, B. C. Agee, *IEEE Trans. ASSP*, vol. ASSP-31, pp. 459-472, Apr. 1983).

Self-Recovering Equalization and Carrier Tracking in Two-Dimensional Data Communication Systems (D. N. Godard, *IEEE Trans. Comm.*, vol. COM-28, pp. 1867-1875, Nov. 1980).

*Signal Enhancement—a Composite Property Mapping Algorithm* (J. A. Cadzow, *IEEE Trans. ASPP*, vol. 36, No. 1, pp. 49-62, Jan. 1988).

SELF-COHERENCE RESTORING SIGNAL EXTRACTION APPARATUS AND METHOD

CROSS-REFERENCE TO RELATED APPLICATIONS

This application is a continuation of Ser. No. 07/794,306 filed on Nov. 14, 1991, now abandoned, which was a continuation of Ser. No. 07/264,256 filed on Oct. 28, 1988, now abandoned.

BACKGROUND OF THE INVENTION

The present invention relates to signal processing and, more particularly, to signal processing systems for extracting communication signals from environments containing uncorrelated co-channel interference.

The problem of extracting a signal from a noisy environment is well known in the signal processing arts. The fundamental problem facing any receiver designer is how to improve the reception of a desired signal in the presence of unknown and undesired interfering signals, channel distortion, and thermal background noise. In principle, this can be accomplished by signal processing. For example, consider a multisensor receiver consisting of an array of spatially-separated antennae which is receiving a desired signal from a first direction and interfering signals from other directions. By forming the appropriate linear combination of the sensor outputs, the signals arriving from the desired direction will be accentuated while signals from other directions are attenuated. Similarly, in single sensor receivers, notch filters can be used to place notches at the frequencies of narrowband interfering signals and other filter types can be used to equalize linear channel distortion. In both cases, the desired signal reception can be significantly improved by passing the received signal (or signals) through a linear combiner with the proper combiner weights.

The basic problem is to set the combiner weights. If all of the parameters of the interfering signals are known, the proper combiner weights can be calculated. Unfortunately, such information is not always available. In many practical communications problems, the dominant type of channel corruption may be known. However, even in those cases in which the type of corruption is known, it may not be possible to know the numb type of corruption is known, it may not be possible to know the number, strength, or directions-of-arrival of the interfering signals at any given time. For example, in mobile radio applications, these interference parameters will depend on the time of day and the physical location of the transmitter and receiver. In this case, not only will the parameters be unknown at the beginning of the transmission, but also, they may vary during the transmission.

In such environments, it is usually impossible to preset the linear combiner weights to significantly improve reception of the desired signal. Hence, an adaptive algorithm must be used to learn the correct weight settings and to vary these settings over the course of the transmission if the parameters vary. This is accomplished by exploiting some known characteristic of the desired signal that distinguishes it from the interfering signals and noise.

Prior art methods for calculating the combiner weights have focused primarily on methods that optimize some measure of signal quality. A number of different quality measures have been used. For example, the Applebaum algorithm (S. P. Applebaum, "Adaptive Arrays," Syracuse University Research Corporation," Rep. SPLTR66-1, August 1966) maximizes the signal-to-noise ratio at the output to the array. The Widrow-hoff least-mean-square algorithm (B. Widrow, "Adaptive Filters I: Fundamentals" Stanford University Electronics Laboratory, Systems Theory Laboratory, Center for Systems Research, Rep. SU-SEL-66-12, Tech. Rep. 6764-6, December 1966) minimizes the mean-square-error between the desired signal and the output of an adaptive array.

More recently, exact least squares algorithms which optimize deterministic, time-averaged, measures of output signal quality have been developed (P. E. Mantey, L. J. Griffiths, "Iterative Least-Squares Algorithms for Signal Extraction," Second Hawaii Conference on Systems Science, Jan. 1969, pp. 767–770. B. Friedlander, "Lattice Filters for Adaptive Processing," Proc. IEEE, pp. 879-867, August 1982). In directly implementing an adaptive processor that optimizes any such quality measure, the receiver designer must have accurate knowledge of the cross-correlation between the transmitted and received signals. In practice, this requires close cooperation between the receiver and the desired-signal transmitter. In applications where the cross-correlations are not known at the start of the desired-signal transmission, these statistics must be learned by the receiver at the start of the transmission and, on tune-varying channels, updated over the course of the transmission.

The earliest methods for accomplishing this in telecommunications applications required the transmitter to send a known signal over the channel. This signal was sent at the beginning of the transmission or intermittently in lieu of the information-bearing signal. In this manner, the receiver could be trained at the start of the transmission and the combiner weights updated during the transmission. Other embodiments of this type of system transmit a pilot signal along with the information-bearing signal. This pilot signal is used to train and continuously adapt the receiver. These methods are effective in those situations in which there is cooperation between the transmitter and receiver.

In many applications, however, quality-optimizing techniques cannot be directly used. For example, the channel may be varying too rapidly for start-up or intermittent adaptation to be effective. In addition, the system resources (power, dynamic-range, bandwidth, etc.) may be too limited to allow pilot signals to be added to the information-bearing signal.

Alternatively, the receiver may not have the necessary control over the transmitter. This is the case when the receiver is a natural source such as a person speaking, or when the receiver that must be adapted is not the intended receiver in the communication channel, e.g., in reconnaissance applications.

In applications in which a known desired signal cannot be made available to the receiver, the designer must make use of blind adaptation techniques that exploit other observable properties of the desired signal or the environment in which the signal is transmitted. Prior art algorithms for accomplishing this may be divided into three classes. In the first class of techniques, referred to as demodulation-directed techniques, a reference signal is produced by demodulating and remodulating the processor output signal. This reference signal is then used as a training signal in a conventional adaptive processing algorithm. This technique is commonly employed in decision-directed and decision-feedback equalizers in telephony systems (J. G. Proakis, "Advances in Equalization of Intersymbol Interference," *Advances in Communications Systems*, ed. by A. V. Balakrishnan, A. J. Viterbi, N.Y. Academic Press, 1975). It has also been used to adapt antenna arrays in spread-spectrum communication systems (R. T. Compton, "An Adaptive Array in a Spread Spectrum Communications System," *Proc. IEEE*, Vol. 66, March 1978).

The primary advantage of demodulation-directed techniques lies in their efficient use of system resources and in their convergence speed. These algorithms rely on the demodulator-remodulator loop providing a very clean estimate of the desired signal. In most of these techniques, this requirement will be met after the demodulator has locked on to the received signal. However, until the demodulator does lock on, the reference signal estimate will generally be poor. For this reason, most demodulation-directed techniques are employed as tracking algorithms after a more sophisticated technique has been used to lock onto the desired signal. Many demodulation directed techniques encounter additional problems in dynamic environments where signals are appearing and disappearing over the course of the desired-signal transmission. In addition, these techniques are expensive to implement and are inflexible in their implementation, since they require a built-in demodulator matched to a specific desired signal to operate. This drawback renders them inapplicable to a system in which a variety of signals are of interest, e.g., in satellite transponders and reconnaissance systems.

The second class of techniques, referred to as channel-directed techniques, exploit known properties of the receiver channel or environment such as the spatial distribution of the received signals. In this class of techniques, knowledge of the receiver channel is used to generate and apply a reference signal to a conventional adaptation algorithm, or to estimate key statistics which are used to optimize the combiner weights. When applied to antenna arrays, most channel-directed methods exploit the discrete spatial distribution of the signals received by the array, i.e., the fact that the received signals impinge on the array from discrete directions of arrival. Examples of channel-directed techniques include the Griffiths P-vector algorithm (L. J. Griffiths, "A Simple Adaptive Algorithm for Real-Time Processing in Antenna Arrays," *Proc. IEEE*, Vol. 57, Oct. 1969) and the Frost constrained LMS algorithm (O. L. Frost, "An Algorithm for Linearly-Constrained Adaptive Array Processing," *Proc. IEEE*, Vol. 60, August 1972). Both of these techniques exploit the known direction-of-arrival of the desired signal. Techniques have also been devised to deal with the situation in which the direction-of-arrival of the desired-signal is unknown. Examples of such techniques are the generalized sidelobe canceller (I. J. Griffiths, M. J. Rude, "The P-Vector Algorithm: A Linearly Constrained Point of View," *Proc. Twentieth Asilomar Conf. on Signals, Systems and Computers*, Pacific Grovel, Calif., November 1986) and the signal subspace techniques referred to as MUSIC (R. O. Schmidt, "Multiple Emitter Location and Signal Parameter Estimation," *Proc. RADC Spectrum Estimation Workshop*, Oct. 1979. M. Wax, T. Shan, T. Kailath, "The Covariance Eigenstructure Approach to Detection and Estimation by Passive Arrays," *IEEE Trans. ASSP*, 1985) and ESPRIT (A. Paulraj, R. Roy, T. Kailath, "Estimation of Signal Parameters via Rotational Invariance Techniques—ESPRIT," *Proc. Nineteenth Asilomnar Conf. on Signals, Systems and Computers*, Pacific Grove, Calif., November 1985). These approaches can all be thought of as high-resolution spatial spectrum estimation techniques for locating lines in the received signal spatial spectrum.

All of the channel-directed techniques suffer from the common weakness that they require knowledge of the sensor geometry and/or the individual sensor or subarray characteristics to adapt the array. In practice, this characterization is usually obtained by a series of experiments, referred to as array calibration, to determine the so-called array manifold of the sensor network. The cost of array calibration can be quite high, and the measurement procedure is, in many applications, impractical. For example, a $16 \times 16$ planar array calibrated over a sphere with a one degree resolution in elevation and azimuth and using 16 bit accuracy requires approximately 128 megabytes of storage. This storage requirement increases exponentially as the number of search dimensions is increased, e.g., if the calibration is performed over temporal frequency or polarization in addition to elevation and azimuth. In addition, systems with considerably more sensors are desirable. Phased array communication systems have currently been proposed with over 10,000 elements, and current advances in low-cost microwave radio are pushing this figure higher. The storage requirements, not to mention the calibration times, for such large arrays renders these methods impractical. Furthermore, in certain applications, e.g., lightweight spaceborn arrays, airborne arrays, and towed acoustic arrays, the array geometry and even the sensor characteristics may be changing slowly with time; hence, an accurate set of calibration data may never be available.

Even when calibration data is available, the computational cost of using this data can be prohibitive. Both the generalized sidelobe canceller and MUSIC techniques require a search over the set of calibration data during the operation of the algorithm. In addition, the computational complexity of the MUSIC algorithm increases as the cube of the number of sensors in the array. For example, in the $16 \times 16$ sensor example cited above, the generalized sidelobe canceller algorithm would require $300 \times 10^6$ real multiply-and-accumulate (RMAC) operations for a single exhaustive search, while the MUSIC algorithm would require $30 \times 10^9$ RMACs for a single exhaustive search. Even if a 10 Mflop/sec (10 million floating point operations per second) computer were used, a computational time of 30 seconds would be needed using the generalized sidelobe canceller algorithm, and a time of one hour would be needed with the MUSIC algorithm. And, these times do not reflect the additional classification operations required to recognize the one desired signal among the multiple signals extracted by the algorithms.

The ESPRIT technique was pronosed in an effort to overcome these computational and storage problems. This technique does not require calibration data to operate and, hence, avoids many of the problems associated with the other channel-directed approaches. However, ESPRIT requires accurate knowledge of the noise covariance matrix of the received data, and its computational difficulty increases as the cube of the number of sensors in the array. For example, in the above example, the ESPRIT algorithm would require $20 \times 10^6$ RMACs per search operation (about 2 seconds on a 10 Mflop/sec computer). The ESPRIT algorithm has a number of other shortcomings. It does not perform optimal signal extraction in the sense that the signal-to-noise-ratio is maximized, but instead, each output solution extracts a single signal and nulls the remaining coherent signals impinging on the array. The algorithm has difficulty extracting a single desired signal in a light interference background. In addition, the ESPRIT algorithm requires that the array elements be grouped into doublets with identical characteristics and common geometrical displacement. These conditions impose serious constraints on both the manufacture and performance of an ESPRIT array.

In the third class of techniques, referred to as set-theoretic property-mapping and property-restoral techniques, the output of the receiver is forced to possess a set of known properties possessed by the transmitted signal. Here, the receiver processor is adapted to restore know modulation properties of the desired signal to the processor output signal. Modulation properties are defined here as observable properties of the desired signal imparted by the modulation format used at the desired-signal transmitter. In many cases, these properties are destroyed by transmission over the communication channels. For example, the constant modulus property shared by FM, PSK, and CPFSK is destroyed by the addition of noise, other signals, or multipath interference to the transmitted signal. The property-restoral approach adapts a receiver processor to optimize an objective function that measures this property in the output signal.

The first use of the property-restoral concept was in Sato's algorithm (Y. Sato, "A Method of Self-Recovering Equalization for Multilevel Amplitude-Modulation Systems," *IEEE Trans. Comm.*, vol. COM-23, pp. 679-682, June 1975) which was designed to equalize channel distortion in a BPSK telephony signal by minimizing the mean square error between the squared signal and unity. This algorithm was extended to restoral of general constant-modulus and QAM communication signals with the Constant-Modulus Algorithm (J. R. Treichler, B. G. Agee, "A New Approach to Multipath Correction of Constant Modulus Signals," *IEEE Trans. ASSP*, vol. ASSP-31, pp. 459-472, April 1983) and Godard's algorithm (D. N. Godard, "Self-Recovering Equalization and Carrier Tracking in Two-Dimensional Data Communication Systems," *IEEE Trans. Comm.*, vol. COM-28, pp. 1867-1875, November 1980). More recently, set-theoretic property mapping (J. A. Cadzow, "Signal Enhancement—a Composite Property Mapping Algorithm," *IEEE Trans ASSP*, January 1988) has been advanced as a general technique for designing property-restoral algorithms.

The property-restoral algorithms described above have been successfully applied to adaptive signal extraction in both filters and antenna arrays and appear to have strong advantages over both the demodulation-directed and channel-directed techniques. However, these techniques still have drawbacks. The convergence and capture characteristics of all of these algorithms are still not well understood. In addition, the Constant-Modulus Algorithms are highly nondiscriminatory, requiring multitarget implementations to recover all the signals present in dense interference environments. The forrier drawback limits the application of these algorithms in automatic (unsupervised) communication systems where they must operate with a minimum of attention. The latter drawback is of critical importance in large-aperture systems and directed search applications, since it requires the algorithms to extract every signal in the environment using a multitarget implementation and to then classify the signals to find the one desired signal.

Broadly, it is an object of the present invention to provide an improved method for adapting receivers for the extraction of communications signals.

It is another object of the present invention to provide an apparatus and method for extracting signals that do not require a knowledge of the desired signal waveform.

It is yet another object of the present invention to provide an extraction apparatus and method that do not require a knowledge of the direction-of-arrival of the desired signal.

It is a still further object of the present invention to provide an extraction apparatus and method that do not require a knowledge of the background interference environment.

It is yet another object of the present invention to provide an extraction apparatus and method that do not require a knowledge of the geometry of the sensor array or of the individual sensor characteristics.

It is a still further object of the present invention to provide an extraction apparatus and method that can be programmed to sort and automatically extract signals with desired statistical properties from dense interference environments.

It is yet another object of the present invention to provide an extraction apparatus and method that require substantially less computation and storage than prior art competing methods.

It is a still further object of the present invention to provide an extraction apparatus and method that have unambiguous and well-understood convergence and capture properties.

These and other objects of the present invention will be apparent to those skilled in the art from the following detailed description of the invention and the accompanying drawings.

SUMMARY OF THE INVENTION

The present invention comprises a processor and method for extracting a signal s(t) from a signal input vector x(t) in which each component comprises a complex measurement of s(t) together with interference from noise and/or other signals. The processor computes an output signal y(t) by forming the scalar product of x(t) and a vector w having the same number of components as x(t) and chosen such that the self-coherence of y(t) at frequency shift $\alpha$ and time shift $\tau$ is substantially maximized for predetermined values of $\alpha$ and $\tau$.

DETAILED DESCRIPTION OF THE INVENTION

The present invention comprises a method and apparatus for adapting an antenna array to extract a communication signal-of-interest with known self-coherence or conjugate self-coherence properties from environments containing uncorrelated co-channel interference. The present invention does not require a knowledge of the waveform or of the direction-of-arrival of the signal-of-interest. Furthermore, the present invention accomplishes this goal without requiring a knowledge of the array geometry or of the individual sensor characteristics. Finally, the method has a relatively simple and flexible implementation compared to the competing prior art techniques described above.

The present invention may be most easily understood with reference to an array of M sensors. If the individual sensors have radio frequency outputs, the outputs are first downconverted to baseband or an intermediate frequency (IF). The converted sensor output signals are then converted to a complex representation either by a Hilbert transform operation or a separate downconversion of in-phase and quadrature components, to form a multisensor received signal represented by a vector x(t) which is defined by the following relationship $$x(t) = [x_k(t)]_{k=1}^{M}, \qquad (1)$$

where $X_k(t)$ is the complex signal from the kth sensor in the array. For the purpose of this discussion vectors and matrices will be denoted by symbols in bold print. The corrected signal, i.e., the signal-of-interest, is obtained by forming a weighted sum of the individual sensor signals, i.e., $$\begin{aligned} y(t) &= \Sigma\, w_k^* x_k(t) \\ &= w^\dagger x \end{aligned} \qquad (2)$$

where y(t) is the corrected signal, and the $w_k$ are complex weight factors which are computed according to the present invention. Here, the superscripts "*" and "†" denote the complex-conjugate and the complex conjugate transpose, respectively, of the quantity in question. For notational convenience, the $w_k$ will be interpreted as the elements of a vector w.

In the present invention, w is calculated assuming that the signal-of-interest is either self-coherent or conjugate self-coherent. A waveform s(t) is said to be self-coherent at a frequency $\alpha$ if the cross-correlation of s(t) and s(t) frequency shifted by $\alpha$ is nonzero at some lag-time $\tau$, i.e., if $$\begin{aligned} R_{ss}^{\alpha}(\tau) &= <s(t+\tau/2)[s(t-\tau/2)e^{j2\pi\alpha t}]^*>_\infty \\ &= <s(t+\tau/2)s^*(t-\tau/2)e^{-j2\pi\alpha t}>_\infty \end{aligned} \qquad (3)$$

is different from zero for some value of $\tau$. Here $<..>_\infty$ denotes infinite time-averaging of the quantity enclosed by the brackets. A waveform s(t) is said to be conjugate self-coherent at frequency $\alpha$ if the cross-correlation of s(t) and the complex conjugate of s(t) frequency-shifted by $\alpha$ is nonzero at some lag-time $\tau$, i.e., if $$\begin{aligned} R_{ss}^{\alpha*}(\tau) &= <s(t+\tau/2)[s^*(t-\tau/2)e^{j2\pi\alpha t}]^*>_\infty \\ &= <s(t+\tau/2)s(t-\tau/2)e^{-j2\pi\alpha t}>_\infty \end{aligned} \qquad (4)$$

is different from zero for some value of $\tau$.

Self-coherence is commonly induced by periodic switching, gating, mixing, or multiplexing operations at the transmitter. For example, self-coherence is induced at multiples of the baud-rate in PCM signals and at multiples of the pi-lot-tone frequency in FDM-FM signals. Conjugate self-coherence is commonly induced by unbalanced in-phase and quadrature carrier modulation at the transmitter. For example, conjugate self-coherence is induced at twice the carrier frequency in DSB-AM, VSB-AM, BPSK, and unbalanced QPSK signals.

The self-coherence (or conjugate self-coherence) of a received signal is degraded if it is corrupted by additive interference which does not share that coherence. For example a PCM signal-of-interest is corrupted at the receiver if a second PCM modulated at a different baud-rate is present. The present invention adapts a receiver processor such that the self-coherence (or the conjugate self-coherence) of the signal-of-interest is restored to the receiver output signal. Consequently, the acronym SCORE (for Self COherence REstoral) is used to denote the invention.

In the present invention, the weight vector w is computed so as to maximize the degree of self-coherence or conjugate self-coherence in the output signal. The goal here is to linearly combine the elements of x(t) to enhance the signal-of-interest and suppress the noise and interference received by the array. In addition, this is accomplished without using knowledge of the signal-of-interest waveform, signal-of-interest aperture vector, or interference autocorrelation matrix to calculate the linear combiner weights w. In the present invention, this is accomplished by minimizing the function, $F_{LS}$, where $$F_{LS}(w,c) = <|y(t)-u(t)|^2> \qquad (5)$$

or, by maximizing the function, $F_{CROSS}$, where $$F_{CROSS}(w, c) = \frac{|<y(t)u^*(t)>|^2}{[<|y(t)|^2>][<|u(t)|^2>]} \qquad (6)$$

where $<..>$ denotes time-averaging and u(t), which will be referred to as the SCORE reference signal, is defined by $$u(t) = [c^\dagger x(t-\tau)](*)e^{j2\pi\alpha t} \qquad (7)$$

where (*) denotes optional complex-conjugation. The control parameters $\tau$ and $\alpha$ are referred to as the control delay and self-coherence frequency, respectively; the control parameter c is referred to herein as the control vector of the processor.

The control parameters (*), $\tau$, and $\alpha$ are set on the basis of the self-coherence properties of the signal being sought. In the preferred embodiment of the present invention, these parameters are set to yield a strong value of the self-coherence function (or conjugate self-coherence function) of the signal-of-interest, s(t), where the self-coherence function is given by $$|\rho_{ss}^{\alpha}(*)(\tau)|^2 = \frac{|<s(t+\tau/2)[s(*)(t-\tau/2)e^{j2\pi\alpha t}]^*>_\infty|}{<|s(t)|^2>_\infty} \qquad (8)$$

Here, $\langle .. \rangle_\infty$ denotes infinite time-averaging and the optional conjugation (*) is applied if and only if conjugate self-coherence is to be restored. Of these control parameters, only $\alpha$ and the conjugation control are crucial to the operation of the processor. Eq. (8) has been analytically evaluated for a variety of signal modulation types (see, W. A. Gardner, *Introduction to Random Processes with Applications to Signals and Systems*, Macmillan, New York., N.Y., 1985 and W. A. Gardner, *Statistical Spectra Analysis: A Nonprobabilistic Theory*, Prentice Hall, Englewood Cliffs, N.J., 1987), and the self-coherence function has been found to be a slowly varying function with respect to $\tau$; hence there is considerable flexibility in choosing $\tau$.

The control vector c is either fixed or jointly adapted with w over the data reception time. In the following discussion, any algorithm that adapts w to minimize Eq. (5) or maximize Eq. (6) for a fixed c will be referred to as a least squares SCORE algorithm, whereas any algorithm that adapts both w and c using these equations subject to any gain constraint on w and/or c will be referred to as a cross-SCORE algorithm.

The values of w and c that optimize Eqs. (5) and (6) can be determined in terms of the estimated correlation matrices $$R_{xx} = \langle x(t)x\dagger(t) \rangle \quad (9)$$

$$R_{rr} = \langle r(t)r\dagger(t) \rangle \quad (10)$$

$$R_{xr} = \langle x(t)r\dagger(t) \rangle \quad (11)$$

$$R_{xu} = \langle u^*(t)x(t) \rangle \quad (11')$$

where r(t) is referred to as the reference signal vector and is defined by $$r(t) = [x(t-\tau)](*)e^{j2\pi\alpha t} \quad (12)$$

From the above definitions, it can be shown that $$R_{xr} = R_{xx(*)}{}^\alpha(\tau) \quad (13)$$

Matrices $R_{xx}$ and $Rr_{rr} R_{rr}$ are the conventional autocorrelation matrices of x(t) and r(t), respectively. Matrix $R_{xx(*)}{}^\alpha(\tau)$ is the cyclic autocorrelation matrix or the cyclic conjugate correlation matrix of x(t), depending on whether the conjugation (*) is applied in r(t).

In terms of this notation, the w that minimizes Eq. (5) (or maximizes Eq. (6)) for fixed c is given by $$w = g R_{xx}^{-1} R_{xu} \quad (14)$$
$$= R_{xx}^{-1} R_{xr} c(*),$$

where g is an arbitrary scalar gain variable. Similarly, the w and c that jointly minimize Eq. (5) (or maximize Eq. (6)) subject to a gain constraint are given by the solutions of the eigenequations $$\lambda R_{xx} w = R_{xr} R_{rr}^{-1} R_{rx} w \quad (15)$$

$$\lambda R_{rr} c(*) = R_{rx} R_{xx}^{-1} R_c(*) \quad (16)$$

corresponding to the maximum eigenvalue, A, of these equations. The optimal v and c can also be found by setting w using Eq. (14) and then setting c using Eq. (16), or by obtaining the solution to the joint eigenequation $$\nu \begin{bmatrix} R_{xx} & 0 \\ 0 & R_{rr} \end{bmatrix} \begin{bmatrix} w \\ c(*) \end{bmatrix} = \begin{bmatrix} 0 & R_{xr} \\ R_{rx} & 0 \end{bmatrix} \begin{bmatrix} w \\ c(*) \end{bmatrix} \quad (17)$$

corresponding to the maximum eigenvalue, $\nu$, of this equation. An apparatus according to the present invention either approximately or exactly solves these equations using estimates of the correlation matrices $R_{xx}$ and $R_{xr}$.

It should be noted that the other eigenvalues obtained from Eq. (17) provide useful information. If several signals that are self-coherent (or conjugate self-coherent) at $\alpha$ are present, multiple solutions to this eigenequation will be found. Each of the solutions adapts the processor to receive one of these signals if the self-coherence frequencies of these signals are distinct.

An extension of the cross-SCORE algorithm is obtained by generalizing the reference signal vector r(t) according to $$r(t) = [h(t) \otimes (t)](*)e^{j2\pi\alpha t} \quad (18)$$

where h(t) is a general scalar linear time-invariant filter impulse response, and $\otimes$ denotes tile convolution operation. This filter will be referred to as the control filter. The reference signal vector defined in Eq. (12) utilizes a filter that is a delay. Algorithms employing a control filter with an impulse response that is different from a simple time delay are referred to hereinafter as generalized cross-SCORE algorithms. This generalization does not affect the mathematical form of the cross-SCORE algorithm; however, it does affect the implementation of the cross-SCORE algorithm. If the control filter is chosen to be a delay, then $R_{rr}$ can be replaced with $R_{xx}$ in Equations (15)–(17), thereby considerably reducing the computational complexity of the cross-SCORE apparatus. The complexity of the control filter will also strongly affect the complexity of the overall cross-SCORE apparatus, since the filter must process the individual elements of x(t). However, the convergence time of the apparatus can )De improved by matching h(t) to the self-coherence properties of the signal-of-interest in the environment. That is, h(t) should be chosen to maximize $$|\rho_{ss}^\alpha(*)(\tau)|^2 = \frac{|\langle s(t + \tau/2)[\hat{s}(*)(t - \tau/2)e^{j2\pi\alpha\eta}]^* \rangle_\infty|}{\langle |\hat{s}(t)|^2 \rangle_\infty \langle |s(t)|^2 \rangle_\infty} \quad (19)$$

where $$\hat{s}(t) = h(t) \otimes s(t) \quad (20)$$

In summary, the method of the present invention comprises the following steps:

1. Using an analog or digital measurement of the complex data x(t) from a set of sensor elements, compute the $R_{xx}$ using Eq. (9). This can be accomplished by updating $R_{xx}$ after each new measurement of x(t).

2. Form r(t) from x(t) using Eq. (12) or (18) and compute $R_{rr}$ and $R_{xr}$ using Eqs. (10) and (11).

3. If the cross-SCORE algorithm is being implemented, update c(*) by exactly or approximately solving Eq. (16).

4. Update w by solving Eq. (14), and form the array output signal using Eq. (2).

The various correlation matrices which consist of the average values of products of the components of x(t) and r(t) may be calculated by recursively updating the matrices after each new measurement of x(t). Algorithms for such recursive updating are well known in the processing arts (See, P. E. Mantey and L. J. Griffiths, "Iterative Least-Squares Algorithms for Signal Extraction", Second Hawaii Conference of Systems Science, January 1969, pp. 767-770, or R. A. Monzingo, T. W. Miller, Introduction to Adaptive Arrays, John Wiley and Sons, N.Y., N.Y., 1980).

Additional information may be obtained from the parameters obtained in the above described procedure. For example, the maximum eigenvalue obtained from the cross-SCORE procedure can be used to detect or recognize the presence of the signal-of-interest in the received environment. The phase angle of the complex inner product of the processor and control vectors, w and c, can be used to estimate the signal carrier/clock phase. In addition, the array aperture estimate, $R_{xx}w$, can be used to estimate additional parameters such as the polarization of the signal-of-interest or the direction of arrival of the signal-of-interest. The direction of arrival information requires calibration data or a special array geometry for the array in question.

Figure 1A:
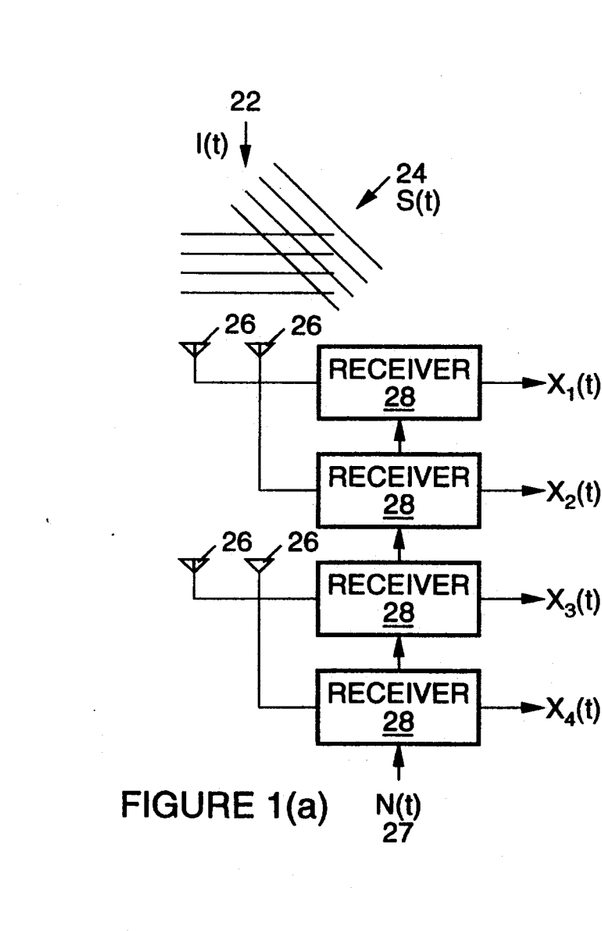
FIG. 1(a) is a block diagram of a receiver front-end that can be used with the present invention.

Having described the method by which the values of w and c are generated, a more detailed description of an apparatus according to the present invention will now be given. The apparatus of the present invention will be referred to hereinafter as a SCORE processor. FIG. 1(a) illustrates a receiver front-end which might be used to provide the inputs, x(t), required by the SCORE processor when said processor is used with an antenna array comprised of antennae 26. To simplify FIG. 1 only two signals, I(t) and S(t), are shown impinging on the antenna array. S(t) is the signal-of-interest, and I(t) represents an interfering signal. The direction of incidence of these signals is indicated by arrows 22 and 24, respectively. Each antenna 26 of the array is connected to a receiver circuit 28. The receiver circuits also introduce noise signals 27.

Figure 1B:
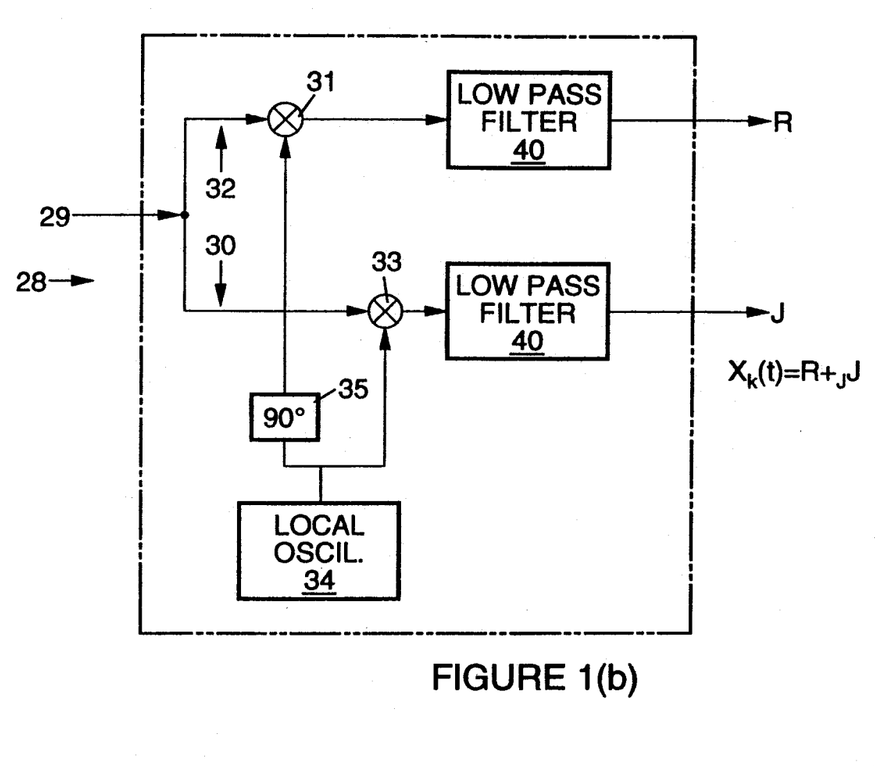
FIG. 1(b) is a block diagram of the preferred embodiment of the receiver circuit shown in FIG. 1(a).

The preferred embodiment of a receiver circuit 28 is shown in FIG. 1(b). The signal 29 from the antenna connected to said receiver circuit is split into two signals on lines 30 and 32. These signals are down-converted to baseband or an intermediate "frequency (IF) utilizing a local oscillator 34. The down-converted sensor output signals are converted to a complex representation by a separate conversion of in-phase and quadrature components utilizing phase shifter 35 which shifts the local oscillator signal by 90 degrees prior to mixing by mixer 33. Mixer 31 is used to produce the in-phase component of the signal. Each component is passed through a low pass filter 40. To simplify the drawings, only one signal line will be shown for each component $x_k(t)$ of x(t) ; however, it is to be understood that each such signal line consists of two lines, one carrying the real component, R, and one carrying the imaginary component, J.

Figure 2:
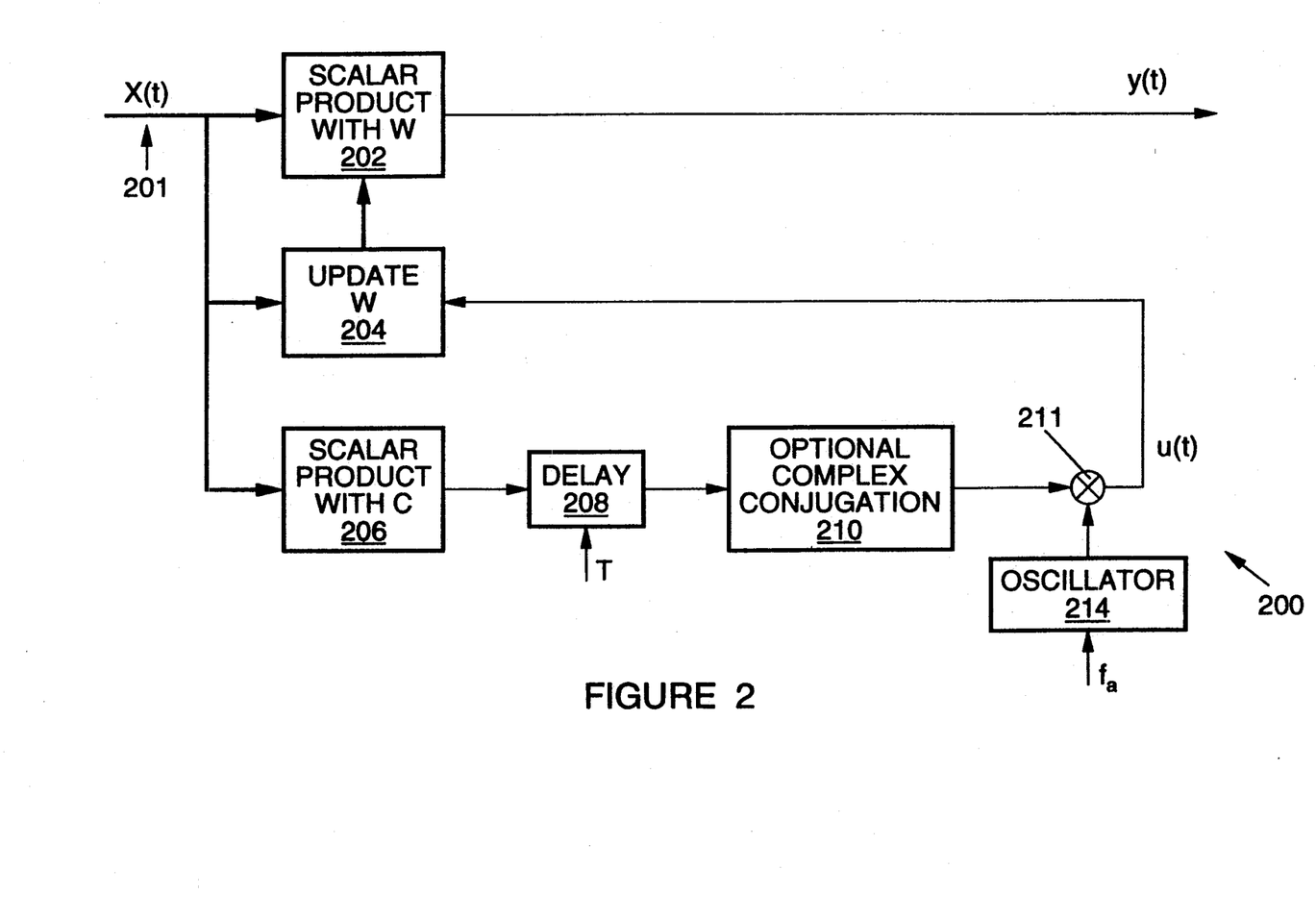
FIG. 2 is a block diagram of one embodiment of a processor according to the present invention.

FIG. 2 illustrates the preferred embodiment of a least-squares SCORE processor 200. The x(t) signal from the receiver front-end is fed to a scalar product circuit 202 which calculates the -scalar product of x(t) and w to form the output signal y(t). To clarify FIG. 2 and the following drawings, those signal paths that carry a vector or matrix are shown in bold. It is assumed that x(t) has not been digitized, i.e., it is still in analog form. Scalar product circuits are known to the prior art; hence, the details of scalar product circuit 202 will not he given here. For the purposes of this discussion, it is sufficient to note that scalar product circuit 202 may be constructed from a plurality of operational amplifiers whose gains are controlled by the values of the components of w. The outputs of these amplifiers are combined using summing amplifiers to form y(t).

The values of w are calculated by minimizing the least squares function given in Eq. (5). The steering signal, u(t), is calculated in analog form by circuit elements 206, 208, 210, 211, and 214 as follows. A scalar signal is created by computing the scalar product of x(t) and c in scalar product circuit 206. The output of this circuit is delayed by a time T by delay circuit 208. Here T is set to the desired value of $\tau$. If w is to be updated on the basis of conjugate self-coherence, the delayed signal is then replaced by the complex conjugate thereof by circuit 210. If conjugate self-coherence is not being used, circuit 210 merely reproduces the input signal at its output. Finally, the output of circuit 210 is frequency shifted by multiplying the signal by $e^{j2\pi\alpha t}$ utilizing a local oscillator 214 whose frequency $f_a$ has been set equal to $\alpha$. This multiplication is performed by mixing circuit 211. Update circuit 204 calculates the value w which minimizes the time average of the squared error $|y(t)u(t)-u(t)|^2$.

Figure 3:
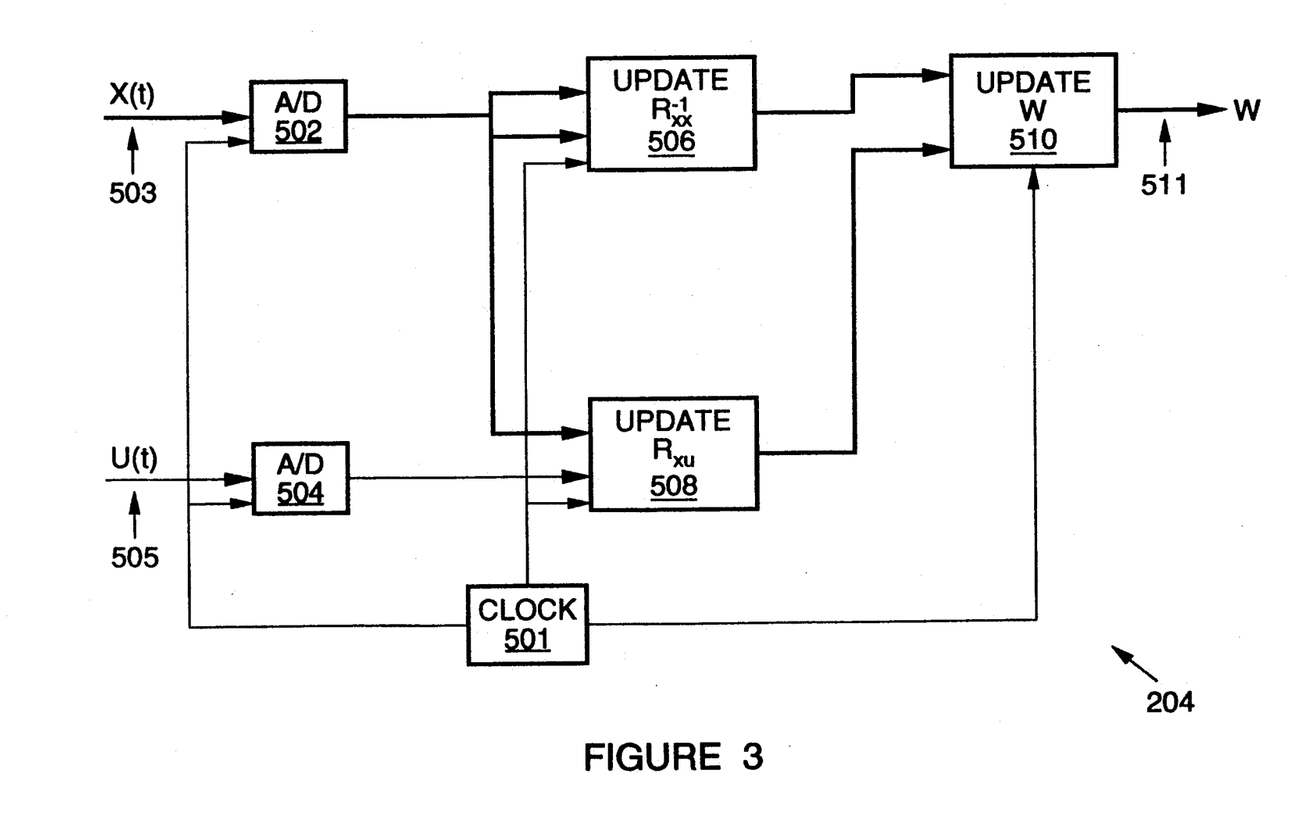
FIG. 3 is a block diagram of the preferred embodiment of an update circuit shown in FIG. 2.

The preferred embodiment of update circuit 204 is shown in FIG. 3. Update circuit 204 utilizes the first relationship in Eq. (14) to calculate the value of w that minimizes $F_{LS}$. The value of w is calculated on a recursive basis under the control of a clock 501. During each clock cycle, the values of the components of x(t) are digitized by a bank of A/D converters 502. These values are fed to an update circuit 506 which updates the values in $R_{xx}^{-1}$ preferably utilizing all algorithm such as that of Woodward for updating an inverse of a correlation matrix. Circuits for updating the inverse of a correlation matrix are well known in the signal processing arts and hence will not be described in detail here. For the purposes of this discussion, it is sufficient to note, that update circuit 506 typically comprises a bank of multiply and accumulate circuits. Each such circuit calculates the product of two components of vector x(t) and accumulates the results so as to form the appropriate time averages.

Similarly, A/D converter 504 digitizes u(t) and outputs the digitized result to update circuit 508 which updates the average of $R_{xu}$. The updated values calculated by update circuits 506 and 508 are then used to calculate a new value for w by update circuit 510 which performs the multiplications given in Eq. (14) above.

Update circuit 204 is preferably a three stage pipeline processor. At each clock cycle, the current values of x(t) and u(t) are digitized by circuits 502 and 504. The values so digitized one cycle earlier are used to update $R_{xx}^{-1}$ and $R_{xu}$. The values of $R_{xx}^{-1}$ and $R_{xu}$ calculated one cycle earlier, i.e., based on the digitized values of x and u two cycles earlier, are then used to update v which is outputted on bus 511.

The value of the gain constant, g, shown in Eq. (14) is preferably chosen so as to prevent overflows or underflows in the various calculational elements of update circuit 204.

SCORE processor 200 does not determine the values of the various components of the control vector c; hence these values must be provided. If calibration data is available for the antenna array and if the direction of incidence of the signal-of-interest is also known, then c can be chosen so as to beamform in the direction of incidence of the signal-of-interest. If such data is not available, c is preferably chosen to provide an isotropic response for the antenna array.

However, if the proper values for c are not known, it is preferred hat both w and c be simultaneously optimized, i.e., that a cross-SCORE processer be used. A block diagram of such a processor is shown at 300 in FIG. 4. In a manner similar to that described above with reference to SCORE processor 200, the scalar product of the vector input x(t) received on bus 301 and w is calculated by scalar product circuit 302 to form the output signal y(t). The vector input x(t) is also used to construct the vector r(t) given in Eq. (12) above using circuits 306, 310, 312, and 314. Delay circuit 306 delays each component of x(t) by a time, T, which is set equal to $\tau$. If w and c are being chosen using the conjugate self-coherence formulas, then each component of the delayed signal is replaced by its complex conjugate by circuit 310. Finally, each component of the output of circuit 310 is multiplied by $e^{j2\pi\alpha t}$ by mixing the output with a signal from a local oscillator 314 whose frequency $f_a$ has been set equal to $\alpha$. This mixing operation is performed by circuit 312.

Figure 4:
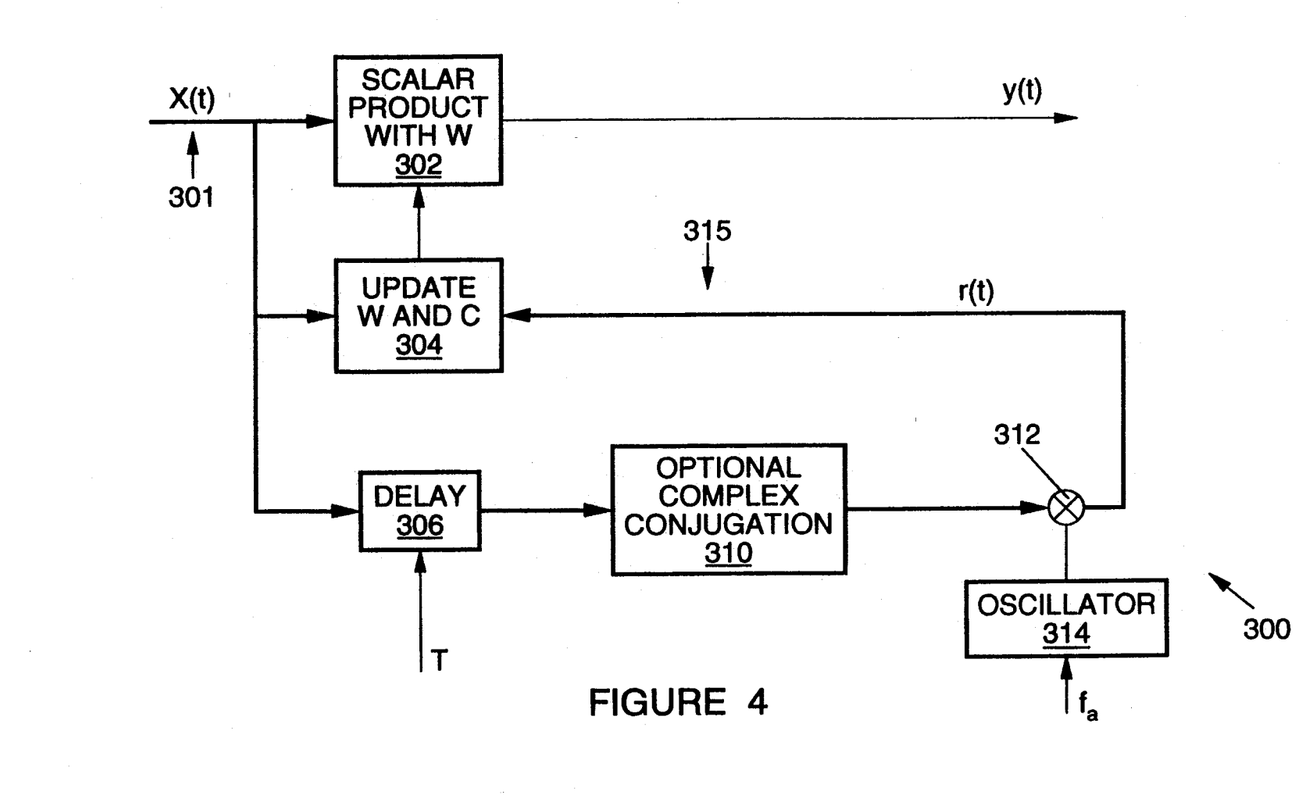
FIG. 4 is a block diagram of a second embodiment of the present invention.
Figure 5:
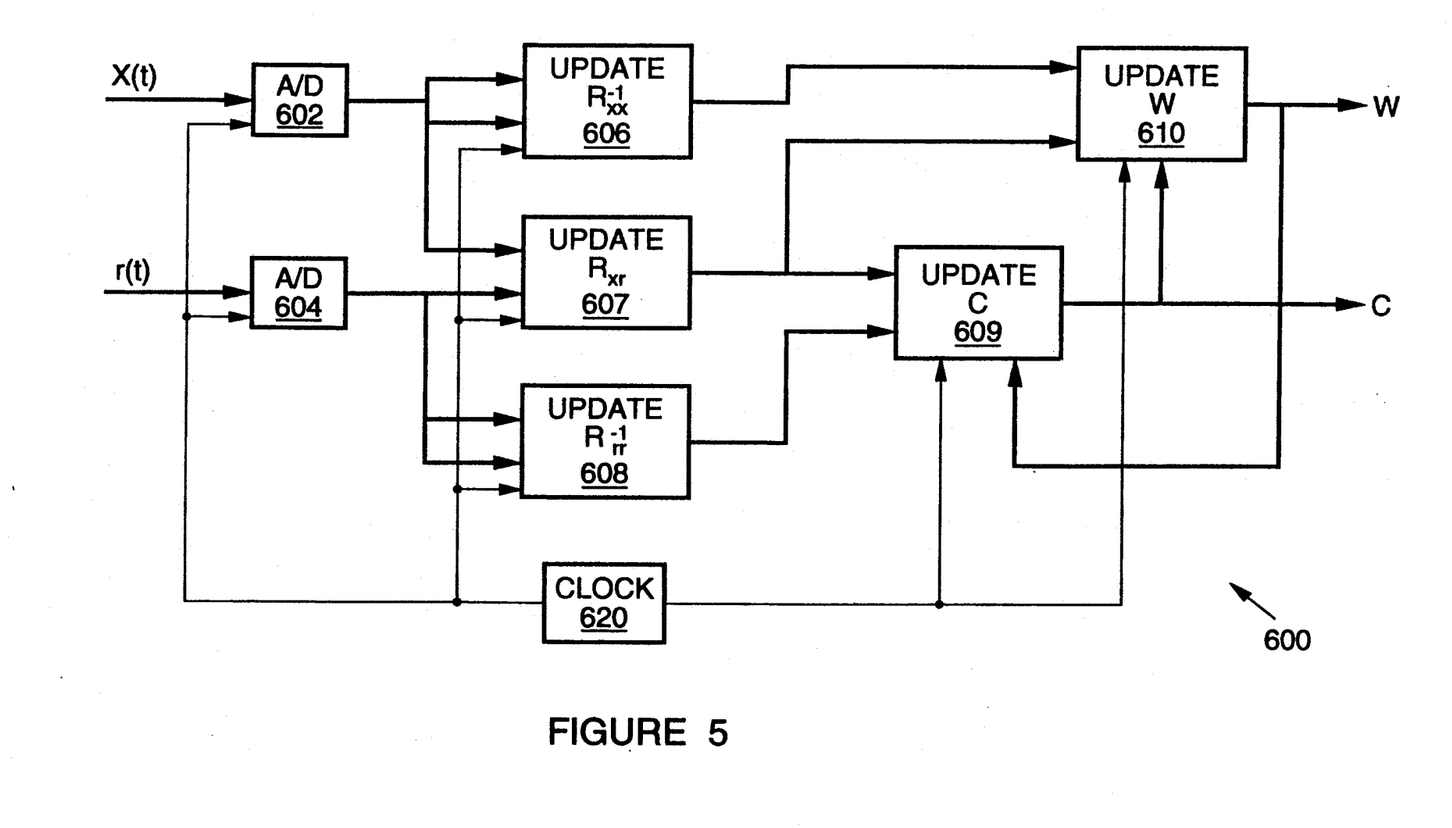
FIG. 5 is a block diagram of the preferred embodiment of an update circuit shown in FIG. 4.

The resulting signal, r(t), is inputted to an update circuit 304 via bus 315. Update circuit 304 also receives x(t) as one of its inputs. The preferred embodiment of update circuit 304 is shown in FIG. 5 at 600. Referring to FIG. 5, the measured values of x(t) are inputted to a bank of A/D converts 602 which digitize x(t). Similarly, the components of r(t) are digitized by a bank of A/D converters 604. The digitized values of the components of x(t) and r(t) ar inputted to circuits 606-608 which are used to update the values of the correlation matrices given in Eqs. (9)-(11) or the appropriate inverses thereof. In the preferred embodiment, w is updated using Eq. (14) by update circuit 610. Then c is updated using the new value of w and Eq. (16) by update circuit 609. However, as noted above, there are several algorithms that may be used to find the values of w and c that optimize Eqs. (5) and (6). Hence, it will be obvious to those skilled in the art that update circuits 609 and 610 may be replaced by other processing means that calculate the solution to one of the above described equations.

In the preferred embodiment, update circuit 600 is a four stage pipeline processor which is tinted by clock 620. In each clock cycle, the current values of x(t) and r(t) are calculated by A/D banks 602 and 604. The values calculated by these banks in the previous clock cycle are used by update circuits 606-608 to update the various matrices used to calculate new values for w and c. The values of these matrices calculated in the previous cycle, i.e., based on x(t) and r(t) values digitized two cycles earlier, are used in conjunction with the previous values of w to update c. Finally, the new value of c is used in conjunction with these matrices to calculate a new value for w.

Although the present invention has been described with reference to certain specific algorithms for optimizing Eqs. (5) and (6), it will be apparent to those skilled, in the art that other methods of optimizing these equations may be utilized. For example, the signals u(t) and y(t) generated in FIG. 2 may be inputted to a processor that searches for the values of w and/or c that minimize the time average of the square of the absolute value of the difference of u(t) and y(t), subject to an equality constraint on either $<|u(t)|^2>$ or $<|y(t)^2>$ (which can be interpreted as a weighted-norm constraint on either c or w), without using the matrices described above. Algorithms that find the constrained minimum of an arbitrary function of one or more variables are well known to those skilled in the signal processing and mathematical arts.

In this regard, it should be noted that signal processors that calculate the value of w so as to maximize an objective function are known to the prior art. The present invention differs from such processors in the manner in which the reference signal, i.e., u(t) or r(t), is obtained. In the present invention, a reference signal that depends on the measured signal x(t) frequency shifted by $\alpha$ is used to generate the processor weight vector w. The processor weight vector is calculated such that the self-coherence (or conjugate self-coherence) of the output signal, y(t), is greater than the self-coherence (or conjugate self-coherence) of the input signals, $x_k(t)$, that makeup the input signal vector x(t). In the above examples, w is calculated so as to maximize the self-coherence (or conjugate self-coherence) of the output signal.

Figure 6:
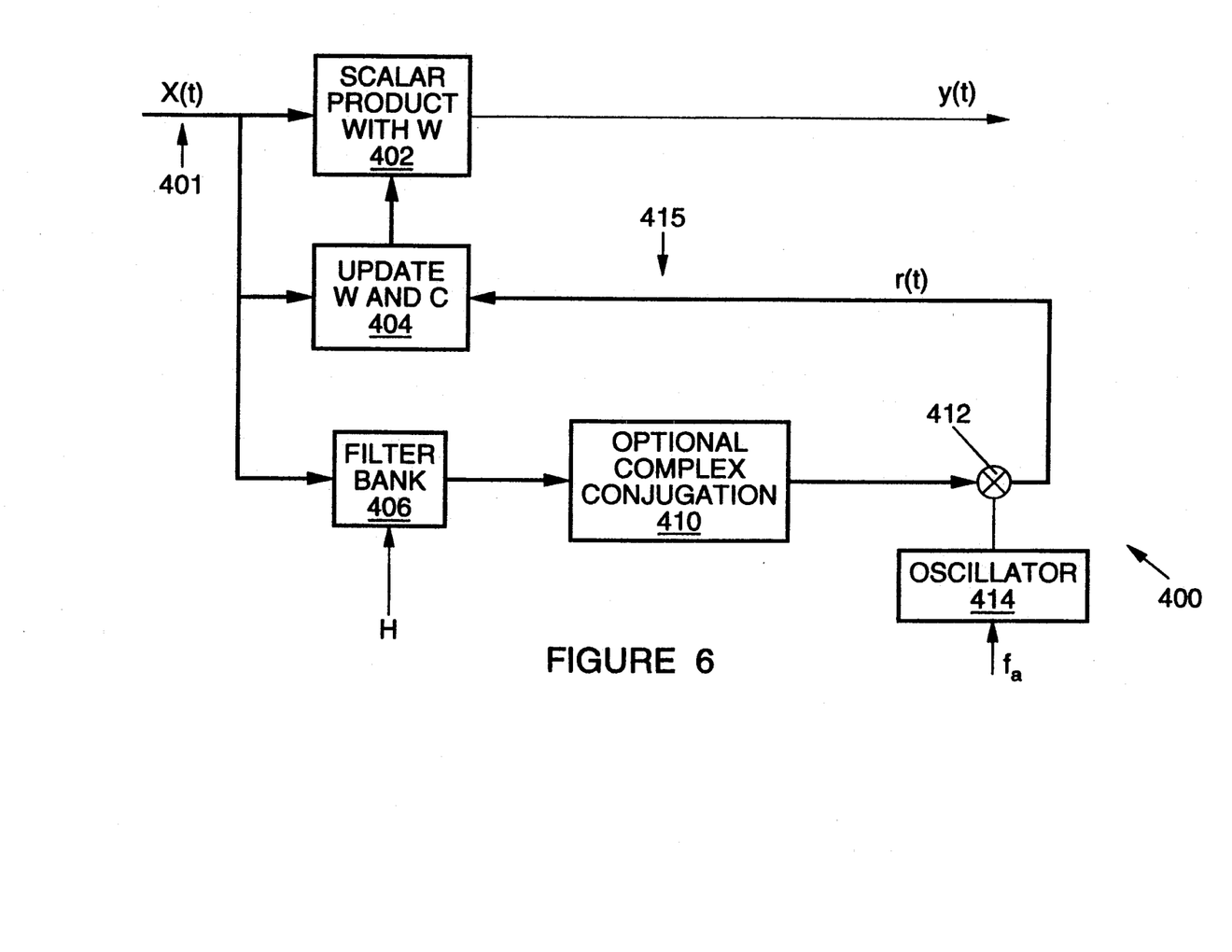
FIG. 6 is a block diagram of the preferred embodiment of the present invention.

In the examples discussed above, the reference signal depends on the measured signal delayed by $\tau$. As noted above with reference to Eq. (18), a more generalized form of reference signal may be generated by first filtering x(t) and then frequency shifting the filtered signal to produce the reference signal. The delay used in the above described embodiments of the present invention is merely one case of a "filter". FIG. 6 illustrates a more general, SCORE processor 400 that utilizes such a filter. Generalized-SCORE processor 400 constructs the output signal y(t) by taking the scalar product of x(t) which is inputted on bus 401 and a vector w utilizing circuit 402 which operates in a manner analogous to that described with reference to previously described embodiments of the present invention.

The processor vector w is calculated so as to optimize Eqs. (5) or (6). The reference signal r(t) is generated by filtering x(t) using filter bank 406. In the preferred embodiment of the present invention, the same filter is applied to each component of x(t); however, embodiments in which different filters are applied to different components of x(t) will be apparent to those skilled in the art of signal processing. If conjugate self-coherence is being optimized, the filtered signals are conjugated by circuit 410, otherwise circuit 410 merely copies the filtered signals to mixer 412 which shifts the frequency of the filtered signals by $f_a(=\alpha)$ to generate r(t) which is inputted to update circuit 404 on bus 415. Update circuit 404 calculates new values for c and w such that self-coherence (or conjugate self-coherence) with a delay of zero is maximized. Update circuit 404 can utilize any one of the approaches discussed above with reference to Eqs. (9)-(17) with r(t) from Eq. (18) instead of the r(t) defined in Eq.(12).

Accordingly, there bas been described herein a novel signal processing system. Various modifications to the present invention will become apparent to those skilled in the art from the foregoing description and accompanying drawings. Accordingly, the present invention is to be limited solely by the scope of the following claims.

What is claimed is:

1. An apparatus for adapting an array of antennas upon which one or more signals impinges and extracting a signal of interest s(t) therefrom, comprising:
   (a) receiving means for receiving on an array of antennas upon which one or more signals impinges, a plurality of input signals represented by a signal input vector x(t) having M components in which each component comprises an electrical signal representing a complex measurement of a self-coherent signal of interest s(t) contained in said input signals together with interference from noise and/or other signals;

(b) reference signal means for generating a reference signal vector r(t) from said signal input vector x(t), said reference signal means coupled to an output of said receiving means;

(c) said reference signal means including filtering means for filtering each component of said signal input vector x(t) through a predetermined filter, said reference signal means including shifting means for frequency shifting each component of said signal input vector x(t) by a frequency $\alpha$;

(d) weight means for providing and updating a weight vector w having M components from said signal input vector x(t), said weight means including a first input coupled to an output of said receiving means, said weight means including a second input coupled to an output of said reference signal means; and (e) summing means for generating an output signal y(t) having a measure of self-coherence, said summing means including a first input coupled to an output of said receiving means, said summing means including a second input coupled to an output of said weight means;

(f) wherein said weight means provides and updates said weight vector w to maximize self-coherence in said output signal y(t).

2. The processor of claim 1, wherein said filtering means comprises means for delaying each component of said signal input vector x(t) by a time equal to $\tau$.

3. The process of claim 1, wherein said weight means comprises:

(a) first correlator means for generating and updating an inverse of an autocorrelation matrix of said signal input vector x(t), said first correlator means having an input coupled to said signal input vector x(t);

(b) second correlator means for generating a correlation matrix of said signal input vector x(t) and said signal reference vector r(t), said second correlator means having a first input coupled to said reference signal vector r(t), said second correlator means having a second input coupled to said signal input vector x(t); and (c) first updating means for generating and updating said weight vector w, wherein said first updating means has a first input coupled to an output of said first correlator means and a second input coupled to an output of said second correlator means.

4. The processor of claim 3, wherein said weight vector w is generated by forming a product of the matrix of correlations of said signal input vector x(t) and a control vector c, and wherein self-coherence in said output signal y(t) is maximized when said weight vector w and said control vector c are obtained to jointly minimize $$F_{LS}(w,c) = <|y(t)-u(t)|^2>$$

where $u(t) = c\dagger r(t)$ and where $<\cdot>$ denotes time averaging over the interval used to determine weight vector w and control vector c.

5. The process of claim 1, wherein said weight means comprises:

(a) first correlator means for generating and updating an inverse of an autocorrelation matrix of said signal input vector x(t), said first correlator means having an input coupled to said signal input vector x(t);

(b) second correlator means for generating and updating a correlation matrix of said reference signal vector r(t) and said signal input vector x(t), said second correlator means having a first input coupled to said reference signal vector r(t) and a second input coupled to said signal input vector x(t);

(c) third correlator means for generating and updating an inverse of the autocorrelation matrix of said reference signal vector r(t), said third correlator means having an input coupled to said reference signal vector r(t);

(d) first updating means for generating and updating a control vector c, wherein said first updating means has a first input coupled to an output of said second correlator means and a second input coupled to an output of said third correlator means; and (e) second updating means for generating and updating said weight vector w, said second updating means having a first input coupled to an output of said first correlator means, a second input coupled to said output of said second correlator means, and a third input coupled to an output of said first updating means;

(f) wherein said weight vector w is generated by forming a product of the matrix of correlations of said signal input vector x(t) and said control vector c.

6. The processor of claim 5, wherein self-coherence in said output signal y(t) is maximized when said weight vector w and said control vector c are obtained to jointly maximize $$F_{CROSS}(w,c) = \frac{|<y(t)u^*(t)>|^2}{[<|y(t)|^2>][<|u(t)|^2>]},$$

where $u(t) = c\dagger r(t)$ and where $<\cdot>$ denotes time averaging over the interval used to determine weight vector w and control vector c.

7. An apparatus for extracting a signal of interest s(t) from a plurality of signals impinging upon an array of antennas, comprising:

(a) receiving means for receiving on an array of antennas upon which one or more signals impinges, a plurality of input signals represented by a signal input vector x(t) having M components in which each component comprises an electrical signal representing a complex measurement of a conjugate self-coherent signal of interest s(t) contained in said input signals together with interference from noise and/or other signals;

(b) reference signal means for generating a reference signal vector r(t) from said signal input vector x(t), said reference signal means coupled to an output of said receiving means, said reference signal means including filtering means for filtering each component of said signal input vector x(t) through a predetermined filter, said reference signal means including means for replacing each said filtered component by the complex conjugate thereof, said reference signal means including shifting means for frequency shifting each component of said signal input vector x(t) by a frequency α;

(c) weight means for providing and updating a weight vector w having M components, said weight means having a first input coupled to an output of said receiving means and a second input coupled to an output of said reference means; and (d) summing means for generating an output signal y(t) having a measure of conjugate self-coherence, wherein said summing means has a first input coupled to an output of said receiving means and a second input coupled to an output of said reference means;

(e) wherein said weight means provides and updates said weight vector w to maximize conjugate self-coherence in said output signal y(t).

8. The processor of claim 7, wherein said weight means comprises:

(a) first correlator means for generating an inverse of an autocorrelation matrix of said signal input vector x(t), said first correlator means having an input coupled to said signal input vector x(t);

(b) second correlator means for generating a correlation matrix of said signal input vector x(t) and said reference signal vector r(t), said second correlator means having a first input coupled to said reference signal vector r(t) and a second input coupled to said signal input vector x(t); and (c) first updating means for generating and updating a product to provide said weight vector w, wherein said first updating means has a first input coupled to an output of said first correlator means and a second input coupled to an output of said second correlator means.

9. The processor of claim 8, wherein said weight vector w is generated by forming a product of the matrix of correlations of said signal input vector x(t) and a conjugate control vector c*, and wherein conjugate self-coherence in said output signal y(t) is maximized when said weight vector w and said conjugate control vector c* are obtained to jointly minimize $$F_{LS}(w, c^*) = <|y(t) - u^*(t)|^2>.$$

where $u^*(t) = c\ r(t)$ and where $<\cdot>$ denotes the time averaging over the interval used to determine weight vector w and control vector c.

10. The process of claim 7, wherein said weight means comprises:

(a) first correlator means for generating and updating an inverse of an autocorrelation matrix of said signal input vector x(t), said first correlator means having an input coupled to said signal input vector x(t);

(b) second correlator means for generating and updating a correlation matrix of said reference signal vector r(t) and said signal input vector x(t), said second correlator means having a first input coupled to said reference signal vector r(t) and a second input coupled to said signal input vector x(t);

(c) third correlator means for generating and updating an inverse of the autocorrelation matrix of said reference signal vector r(t), said third correlator means having an input coupled to said reference signal vector r(t);

(d) first updating means for generating and updating said conjugate control vector c*, wherein said first updating means has a first input coupled to an output of said second correlator means and a second input coupled to an output of said third correlator means; and (e) second updating means for generating and updating said weight vector w, wherein said second updating means has a first input coupled to an output of said first correlator means, a second input coupled to said output of said second correlator means, and a third input coupled to an output of said first updating means;

(f) wherein said weight vector w is generated by forming a product of the matrix of correlations of said signal input vector x(t) and said conjugate control vector c*.

11. The process of claim 10, wherein conjugate self-coherence in said output signal y(t) is maximized when said weight vector w and said conjugate control vector c* are obtained to jointly maximize $$F_{CROSS}(w, c^*) = \frac{|<y(t)u(t)>|^2}{[<|y(t)|^2>][<|u(t)|^2>]}$$

where $u^*(t) = c\dagger r(t)$ and where $<\cdot>$ denotes time averaging over the interval used to determine weight vector w and conjugate control vector c*.

12. The process of claim 7, wherein said filtering means comprises means for delaying each component of said signal input vector x(t) by a time equal to τ.

13. A method for adapting an array of antennas upon which one or more signals impinges and extracting a signal of interest s(t) therefrom, comprising the steps of:

(a) receiving on an array of antennas upon which one or more signals impinges, a plurality of input signals represented by an signal input vector x(t) having M components in which each component comprises an electrical signal representing a complex measurement of a self-coherent signal of interest s(t) contained in said input signals together with interference from noise and/or other signals;

(b) generating a reference signal vector r(t) from said signal input vector x(t) in response to said signal input vector x(t), said generating step including the steps of filtering each component of said signal input vector x(t) through a predetermined filter and shifting each component of said signal input vector x(t) by a frequency α;

(c) providing and updating a weight vector w having M components in response to said reference signal vector r(t) and said signal input vector x(t); and (d) generating an output signal y(t) having a measure of self-coherence in response to said signal input vector x(t) and weight vector w by summing said weight vector w and said signal input vector x(t);

(e) wherein said weight vector w is generated and updated so as to maximize self-coherence in said output signal y(t).

14. The method of claim 13, wherein said filtering step comprises delaying each component of said signal input vector x(t) by a time equal to τ.

15. The method of claim 13, wherein said step of providing and updating said weight vector w comprises the steps of:

(a) generating and updating an inverse of an autocorrelation matrix of said signal input vector x(t) in response to said signal input vector x(t);

(b) generating a correlation matrix of said signal input vector x(t) and said reference vector r(t) in response to said reference signal vector r(t) and said signal input vector x(t); and (c) generating and updating a product to provide said weight vector w in response to said inverse of said autocorrelation matrix and said correlation matrix.

16. The method of claim 13, wherein said step of generating and updating generates and updates a product of the matrix of correlations of said signal input vector x(t) and a control vector c, and wherein said step of generating and updating said weight vector w includes the steps of:
  (a) generating and updating an inverse of an autocorrelation matrix of said signal input vector x(t) in response to said signal input vector x(t);
  (b) generating and updating a correlation matrix of said reference vector r(t) and said signal input vector x(t) in response to said reference signal vector r(t) and said signal input vector x(t);
  (c) generating and updating an inverse of the autocorrelation matrix of said reference signal vector r(t) in response to said reference signal vector r(t);
  (d) generating and updating said control vector c in response to said correlation matrix of said reference signal r(t) and said signal input vector x(t), and said inverse of the autocorrelation matrix of said reference signal vector r(t); and
  (e) generating and updating said weight vector w in response to said inverse of said autocorrelation matrix of said signal input vector x(t), said correlation matrix of said reference signal vector r(t) and said signal input vector x(t), and said control vector c.

17. A method for extracting a signal of interest s(t) from a plurality of signals impinging upon an array of antennas, comprising the steps of:
  (a) receiving on an array of antennas upon which one or more signals impinges, a plurality of input signals represented by an signal input vector x(t) having M components in which each component comprises an electrical signal representing a complex measurement of a conjugate self-coherent signal of interest s(t) contained in said input signals together with interference from noise and/or other signals;
  (b) generating a reference signal vector r(t) from said x(t) in response to said signal input vector x(t), said generating step including steps of filtering each component of said signal input vector x(t) through a predetermined filter, replacing each said filtered component by the complex conjugate thereof, and frequency-shifting each component of said signal input vector x(t) by a frequency $\alpha$;
  (c) providing and updating a weight vector w having M components in response to said reference signal vector r(t) and said signal input vector x(t); and
  (d) generating an output signal y(t) in response to said signal input vector x(t) and said weight vector w by summing said weight vector w and said signal input vector x(t);
  (e) wherein said weight vector w being generated and updated to maximize conjugate self-coherence in said output signal y(t).

18. The method of claim 17, wherein said step of providing and updating said weight vector w includes the steps of:
  (a) generating an inverse of an autocorrelation matrix of said signal input vector x(t) in response to said signal input vector x(t);
  (b) generating a correlation matrix of said signal input vector x(t) and said reference vector r(t) in response to said reference signal vector r(t) and said signal input vector x(t);
  (c) generating and updating a product to provide said weight vector w in response to said inverse of said autocorrelation matrix and correlation matrix.

19. The method of claim 18, wherein said step of generating and updating generates and updates a product of the matrix of correlations of said signal input vector x(t) and a conjugate control vector c*, and wherein said step of generating and updating said weight vector w includes the steps of:
  (a) generating and updating an inverse of an autocorrelation matrix of said signal input vector x(t) in response to said signal input vector x(t);
  (b) generating an updating a correlation matrix of said reference vector r(t) and said signal input vector x(t) in response to said reference signal vector r(t) and said signal input vector x(t);
  (c) generating and updating an inverse of the autocorrelation matrix of said reference vector r(t) in response to said reference signal vector r(t);
  (d) generating and updating said conjugate control vector c* in response to said correlation matrix of said reference signal r(t) and said signal input vector x(t), and said inverse of the autocorrelation matrix of said reference signal vector r(t); and
  (e) generating and updating said weight vector w in response to said inverse of said autocorrelation matrix of said signal input vector x(t), said correlation matrix of said reference signal vector r(t) and said signal input vector x(t), and said conjugate control vector c*.

20. The method of claim 18, wherein said filtering step comprises delaying each component of said signal input vector x(t) by a time equal to $\tau$.

* * * * *